(12) United States Patent  (10) Patent No.: US 7,861,455 B2
Ciotlos  (45) Date of Patent: *Jan. 4, 2011

(54) ARTIFICIAL BAIT

(76) Inventor: Neculai Ciotlos, 4671 Albany Cir. #145, San Jose, CA (US) 95120

( * ) Notice: Subject to any disclaimer, the term of this patent is extended or adjusted under 35 U.S.C. 154(b) by 0 days.

This patent is subject to a terminal disclaimer.

(21) Appl. No.: 11/524,144

(22) Filed: Sep. 20, 2006

(65) Prior Publication Data

US 2008/0066368 A1  Mar. 20, 2008

(51) Int. Cl.
*A01K 85/12* (2006.01)
*A01K 85/02* (2006.01)
*A01K 85/00* (2006.01)

(52) U.S. Cl. .................. 43/42.3; 43/42.28; 43/42.24; 43/42.14; 43/42.16; 43/42.19; 43/42.2; 43/42.43; 43/42.37

(58) Field of Classification Search .................. 43/42.3, 43/42.28, 42.24, 42.11, 42.14, 42.16, 42.18, 43/42.19, 42.2, 42.21, 42.4, 42.42, 42.43, 43/42.36, 42.37

See application file for complete search history.

(56) References Cited

U.S. PATENT DOCUMENTS

| | | | | |
|---|---|---|---|---|
| 779,744 A | * | 1/1905 | Shakespeare, Jr. | 43/42.16 |
| 1,467,116 A | * | 9/1923 | Reekers | 43/42.19 |
| 1,530,343 A | * | 3/1925 | Bayer | 43/42.2 |
| 1,609,209 A | * | 11/1926 | Schnell | 43/42.08 |
| 1,610,204 A | * | 12/1926 | Donholt | 43/42.16 |
| 1,725,636 A | * | 8/1929 | Heaslip | 43/42.21 |
| 1,772,250 A | * | 8/1930 | Hagen | 43/42.21 |
| 1,871,387 A | * | 8/1932 | Pflueger | 43/42.36 |
| 1,920,935 A | * | 8/1933 | Khoenle | 43/42.14 |
| 1,989,850 A | * | 2/1935 | Dorsey | 43/42.28 |
| 2,079,335 A | * | 5/1937 | Pflueger | 43/42.16 |
| 2,157,414 A | * | 5/1939 | Johnson | 43/42.2 |
| 2,167,335 A | * | 7/1939 | Hayes | 43/42.28 |
| 2,184,792 A | * | 12/1939 | Charles | 43/42.36 |
| 2,230,919 A | * | 2/1941 | Glenn, I | 43/42.3 |
| 2,261,549 A | * | 11/1941 | Hayes | 43/42.24 |
| 2,292,517 A | * | 8/1942 | Greene | 43/42.4 |
| 2,306,692 A | * | 12/1942 | Flood | 43/42.21 |
| 2,333,174 A | * | 11/1943 | Heddon | 43/42.43 |
| 2,397,968 A | * | 4/1946 | Lind | 43/42.19 |
| 2,494,407 A | * | 1/1950 | Rhodes | 43/42.05 |
| 2,501,428 A | * | 3/1950 | Woodle | 43/42.2 |
| 2,554,342 A | * | 5/1951 | O'Callaghan | 43/42.21 |
| 2,606,387 A | * | 8/1952 | Garner | 43/42.2 |
| 2,611,984 A | * | 9/1952 | Gautsche, Jr. | 43/42.19 |
| 2,626,478 A | * | 1/1953 | Folmer | 43/42.19 |
| 2,662,330 A | * | 12/1953 | Ogburn | 43/42.16 |
| 2,714,778 A | * | 8/1955 | Megerle | 43/42.2 |
| 2,722,766 A | * | 11/1955 | Accetta | 43/42.24 |
| 2,750,701 A | * | 6/1956 | Beames | 43/42.36 |
| 2,753,650 A | * | 7/1956 | Frank et al. | 43/42.36 |
| 2,774,171 A | * | 12/1956 | Pulver | 43/42.19 |
| 2,776,518 A | * | 1/1957 | Felmlee | 43/42.24 |
| 2,783,578 A | * | 3/1957 | Moore | 43/42.16 |
| 2,785,496 A | * | 3/1957 | Menkens | 43/42.19 |

(Continued)

*Primary Examiner*—Darren W Ark
(74) *Attorney, Agent, or Firm*—Haverstock & Owens LLP

(57) ABSTRACT

An artificial bait for fishing with a flexible appendage (28, 28') which is made of soft plastic or other resilient material and it is either formed or interchangeably fitted on a radial bearing (27, 27') rotatably mounted on a shaft (25, 25', 25", 23").

9 Claims, 17 Drawing Sheets

U.S. PATENT DOCUMENTS

| | | | | |
|---|---|---|---|---|
| 2,804,713 | A * | 9/1957 | Johnson | 43/42.2 |
| 2,835,068 | A * | 5/1958 | Latham | 43/42.16 |
| 2,940,205 | A * | 6/1960 | Cherry | 43/42.16 |
| 3,001,318 | A * | 9/1961 | Miller | 43/42.14 |
| 3,100,360 | A * | 8/1963 | Creme | 43/42.24 |
| 3,289,345 | A * | 12/1966 | Gail et al. | 43/42.24 |
| 3,427,744 | A * | 2/1969 | Roberts | 43/42.16 |
| 3,494,063 | A * | 2/1970 | Treaster | 43/42.14 |
| 3,807,079 | A * | 4/1974 | Goforth | 43/42.28 |
| 3,824,732 | A * | 7/1974 | Boone | 43/42.19 |
| 3,947,989 | A * | 4/1976 | Bart | 43/42.28 |
| 3,964,202 | A * | 6/1976 | Ruppa | 43/42.2 |
| 3,965,606 | A * | 6/1976 | Bingler | 43/42.16 |
| 4,211,027 | A * | 7/1980 | Viscardi | 43/42.24 |
| 4,253,263 | A * | 3/1981 | Franklin et al. | 43/42.24 |
| 4,416,080 | A * | 11/1983 | Morrissette | 43/42.2 |
| 4,447,981 | A * | 5/1984 | Bauer | 43/42.21 |
| 4,596,086 | A * | 6/1986 | Garland | 43/42.4 |
| 4,616,440 | A * | 10/1986 | Millroy | 43/42.14 |
| 4,619,067 | A * | 10/1986 | West | 43/42.28 |
| 4,619,069 | A * | 10/1986 | Strickland | 43/42.28 |
| 4,637,158 | A * | 1/1987 | Reid | 43/42.14 |
| D289,790 | S * | 5/1987 | Millroy | D22/129 |
| 4,672,768 | A * | 6/1987 | Pippert | 43/42.24 |
| 4,689,914 | A * | 9/1987 | Quinlan | 43/42.42 |
| 4,709,501 | A * | 12/1987 | Garst | 43/42.3 |
| 4,796,378 | A * | 1/1989 | Krueger et al. | 43/42.4 |
| 4,831,770 | A * | 5/1989 | Dworski | 43/42.28 |
| 4,858,368 | A * | 8/1989 | Tolner et al. | 43/42.36 |
| 5,016,386 | A * | 5/1991 | Lamonica et al. | 43/42.14 |
| 5,121,568 | A * | 6/1992 | Lindmeyer | 43/42.36 |
| 5,263,277 | A * | 11/1993 | Kelly | 43/42.46 |
| 5,303,497 | A * | 4/1994 | Rabideau | 43/42.21 |
| 5,353,540 | A * | 10/1994 | Ward | 43/42.24 |
| 5,428,918 | A * | 7/1995 | Garrison | 43/42.28 |
| 6,018,901 | A * | 2/2000 | DuBois | 43/42.19 |
| 6,199,312 | B1 * | 3/2001 | Link | 43/42.28 |
| 6,360,476 | B1 * | 3/2002 | Anastacio | 43/42.31 |
| 6,408,566 | B1 * | 6/2002 | Ward, Sr. | 43/42.24 |
| 6,598,336 | B2 * | 7/2003 | Link | 43/42.28 |
| 6,601,336 | B1 * | 8/2003 | Link | 43/42.14 |
| 6,634,135 | B1 * | 10/2003 | Rydell | 43/42.1 |
| 6,665,977 | B2 * | 12/2003 | Hammond | 43/42.18 |
| 7,644,533 | B2 * | 1/2010 | Hair et al. | 43/42.14 |
| 7,716,869 | B2 * | 5/2010 | Ciotlos | 43/42.19 |
| 2006/0185220 | A1 * | 8/2006 | Greene et al. | 43/42.28 |
| 2008/0196293 | A1 * | 8/2008 | Milanowski | 43/42.2 |
| 2008/0202015 | A1 * | 8/2008 | Langer | 43/42.19 |
| 2009/0126256 | A1 * | 5/2009 | Gregory | 43/42.2 |

\* cited by examiner

ARTIFICIAL BAIT

CROSS-REFERENCE TO RELATED APPLICATIONS

Not Applicable

FEDERALLY SPONSORED RESEARCH

Not Applicable

BACKGROUND OF THE INVENTION

1. Field of Invention

The present invention relates to artificial baits for fishing, specifically to baits with spinning elements mounted on a shaft and respectively baits with flexible appendages.

2. Prior Art

Artificial baits with spinning elements mounted on a shaft usually comprise a lure body equipped with a wire shaft and a propeller made of sheet metal or other rigid, non resilient materials, rotatably mounted on the shaft ahead of a thrust bead. Like any other fishing lures they have their limitations, proved to be in certain fishing conditions disadvantages: (a) the reaction blades cannot be to large without impeding the fish hooking, their inherently limited reaction surface resulting in limited efficiency, and (b) the propeller attracts fish only when spinning; when paused it is simply an inert piece of tin or other rigid material, attached to a more or less enticing prey imitation.

Baits with flexible appendages make use of materials such as soft plastic, rubber etc. for their lifelike appearance, feel and movement. Moreover, some of these materials can be impregnated with various fish attractants. The flexible appendages are attached in various ways, temporarily, interchangeably, or permanent, to a lure body or to a hook.

OBJECTS AND ADVANTAGES

The object of the present invention is to provide an artificial bait with spinning element mounted on a shaft where the spinning element is made of soft plastic or other resilient material, despite the high friction characteristic to such materials.

Consequently, the present invention also provides a new type of attachment for baits with flexible appendages, which enables an appendage made of resilient material to revolve about a shaft.

Accordingly, the bait provided here has several advantages over the prior art, as follows:

(a) being soft and collapsible, as opposed to rigid, the present spinning element does not impede the fish hooking and therefore can be relatively large and shaped in various ways, possibly imitating frog legs or other animal limbs.

(b) being considerably heavier than the usual tin propeller, the spinning element has more inertia, therefore goes on moving for longer when the bait is paused during a stop and go retrieve.

(c) even when comes to a stop, the spinning element still entices fish to strike through its life-like appearance and, possibly, through contained fish attractants.

(d) when slowly walked through cover, as weed or lily pads, the present bait seems to naturally step over.

(e) the reaction blades of the spinning element do not only spin but also erratically flex back and forth and kick the water with a distinct plopping sound specific to soft, resilient materials.

(f) the spinning element provided here can be easily changed at any time with another one, identical or different in color, shape or size, which means that the manufacturer will also offer packages with replacements.

(g) the present type of attachment for flexible appendages enables an appendage made of resilient material, whether or not shaped as a propeller, to turn about a shaft, therefore to step over weed, lily pads etc.

SUMMARY

In accordance with the present invention, an artificial bait contains a radial bearing of an approximately tubular shape that bears a flexible appendage made of soft plastic or other resilient material enabling it to spin about a shaft, against an end thrust surface, despite the high friction characteristic to such materials.

DRAWINGS—Figures

Figure 1A:
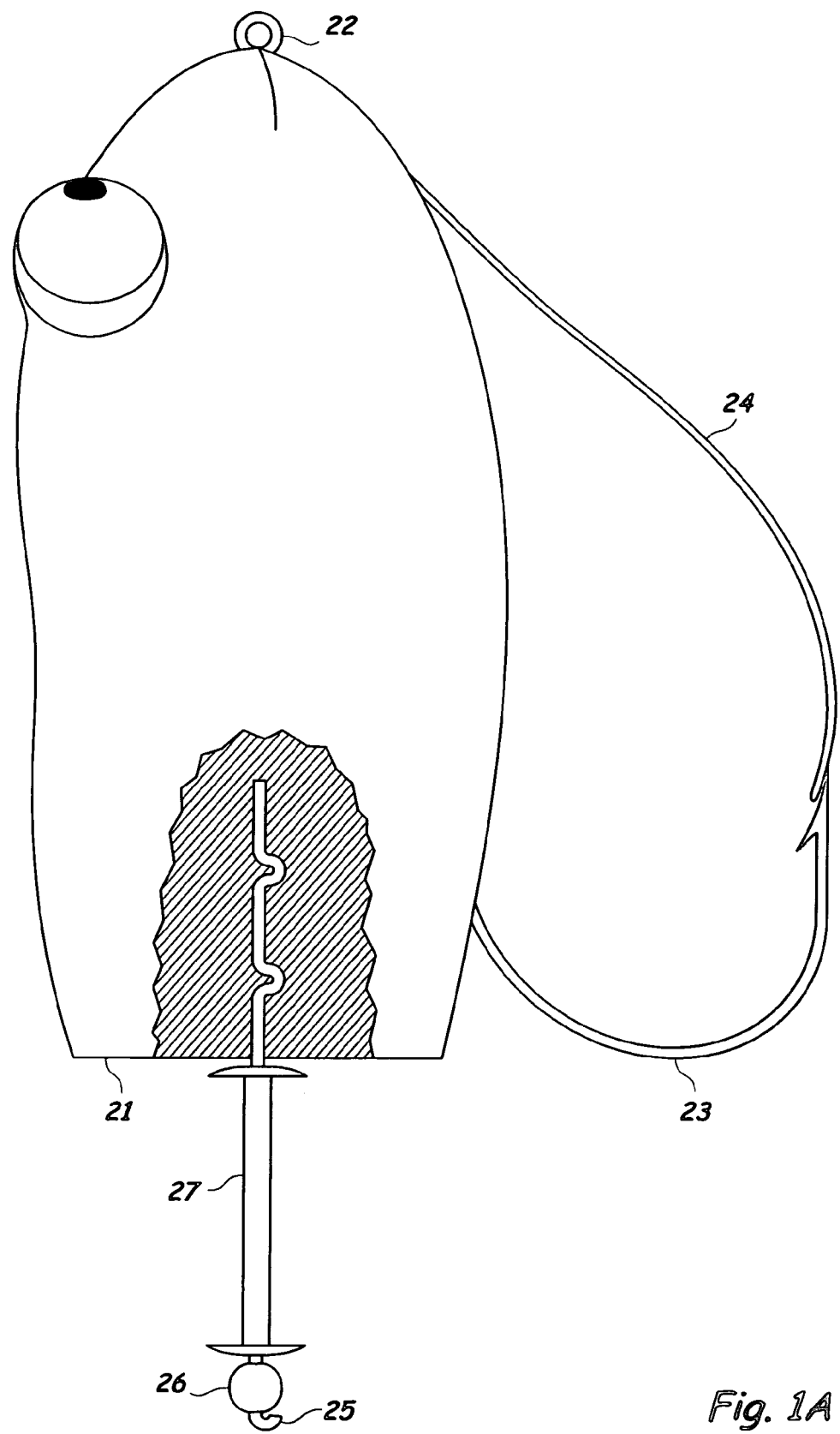
FIG. 1A shows a lure body equipped with a shaft, a thrust bead and a radial bearing.
Figure 1B:
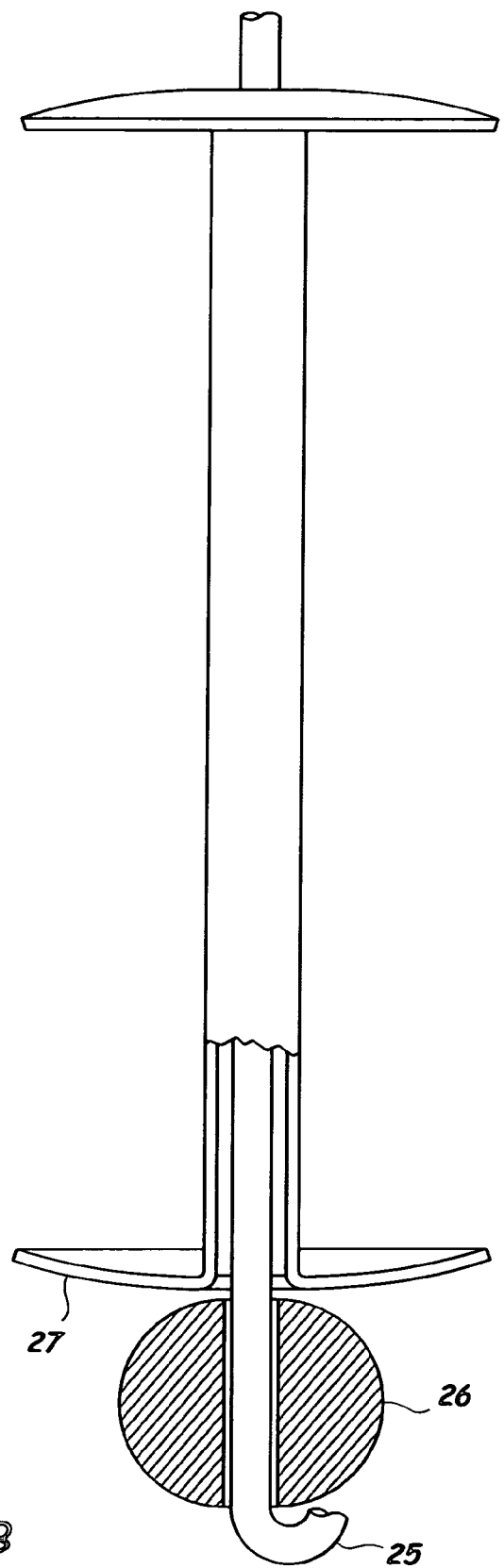
FIG. 1B shows the assembly shaft—thrust bead—radial bearing.
Figure 1C:
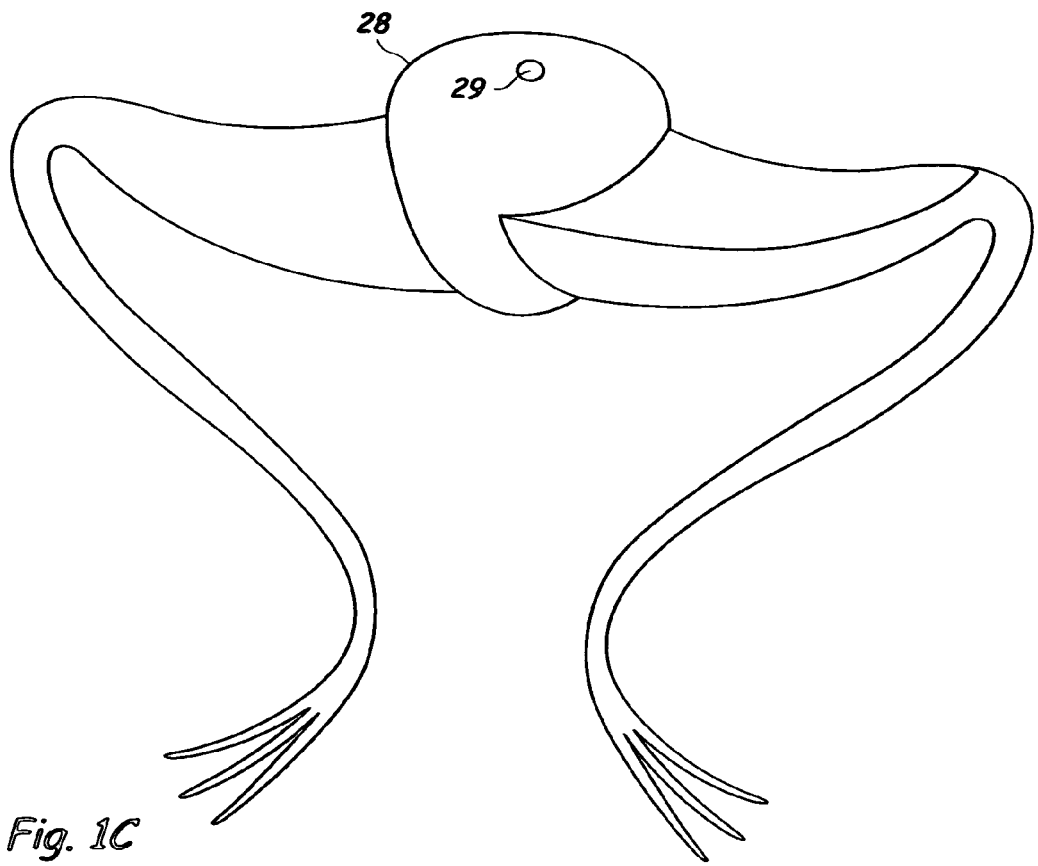
FIGS. 1C-1D show a flexible appendage with an axial longitudinal hole.
Figure 1D:
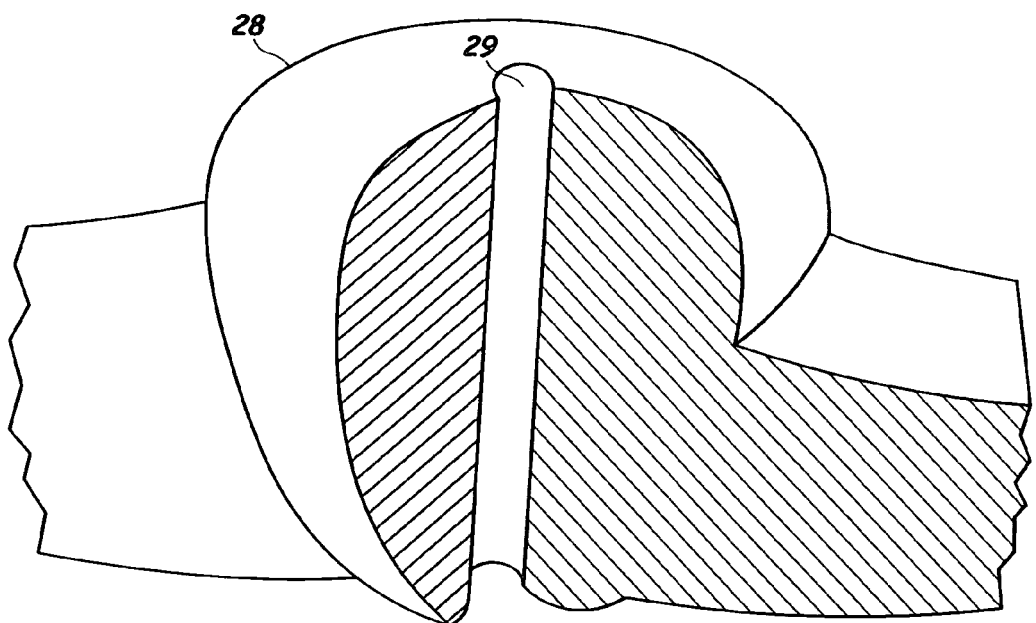
Figure 1E:
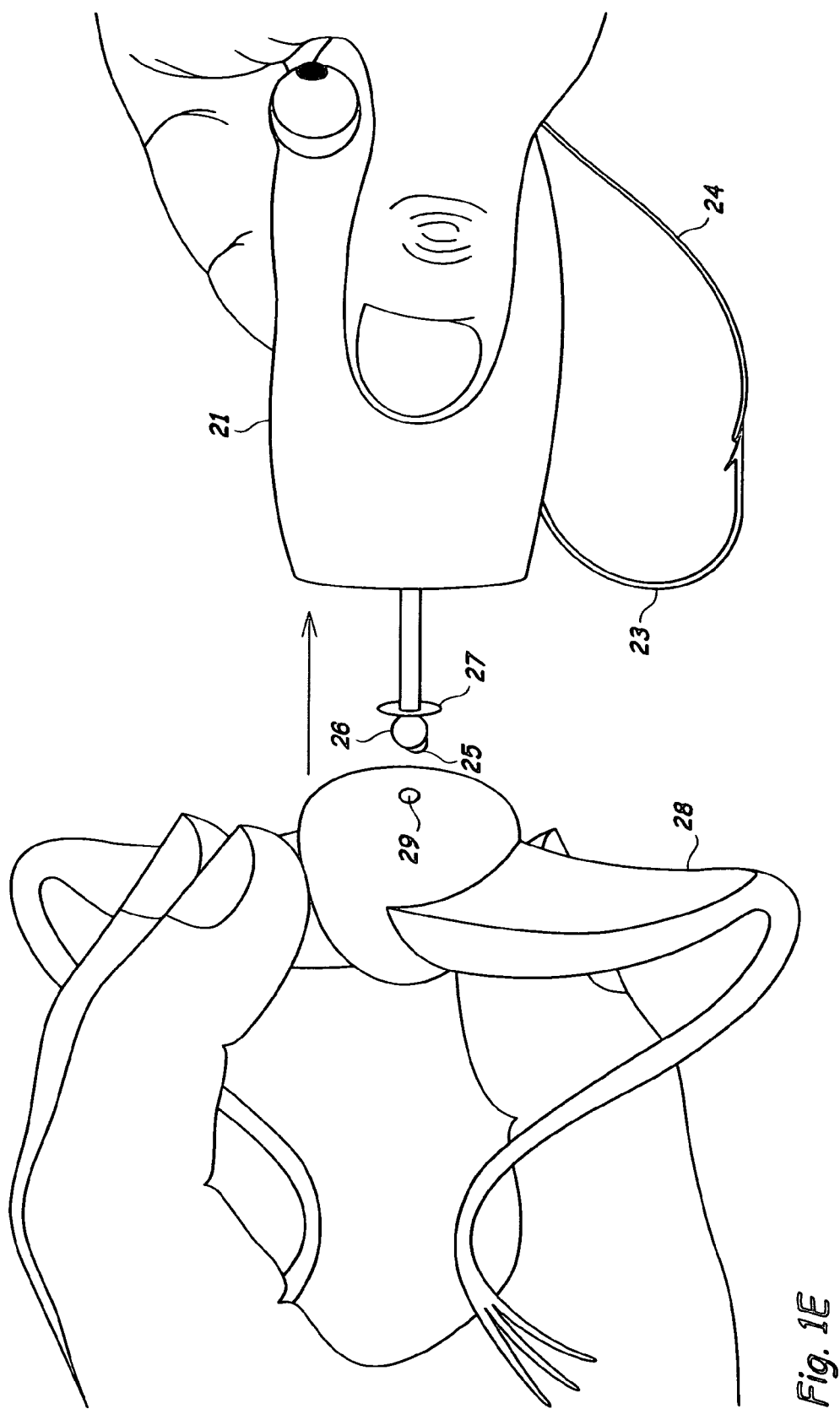

FIG. 1E, suitable as front page view, shows the manual attachment process.

Figure 1F:
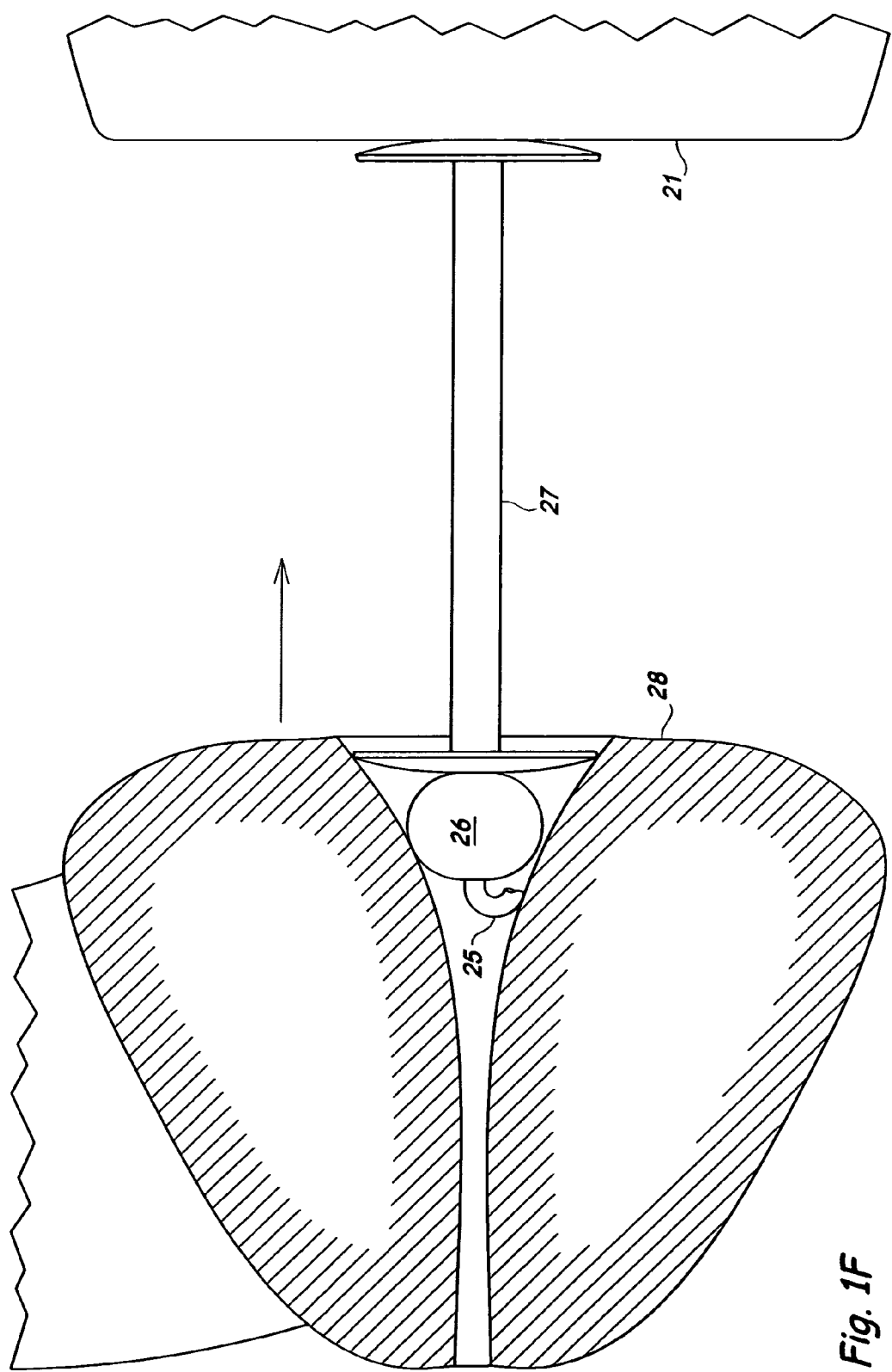

FIG. 1F shows the flexible appendage stretched as it is pushed over the radial bearing.

Figure 1G:
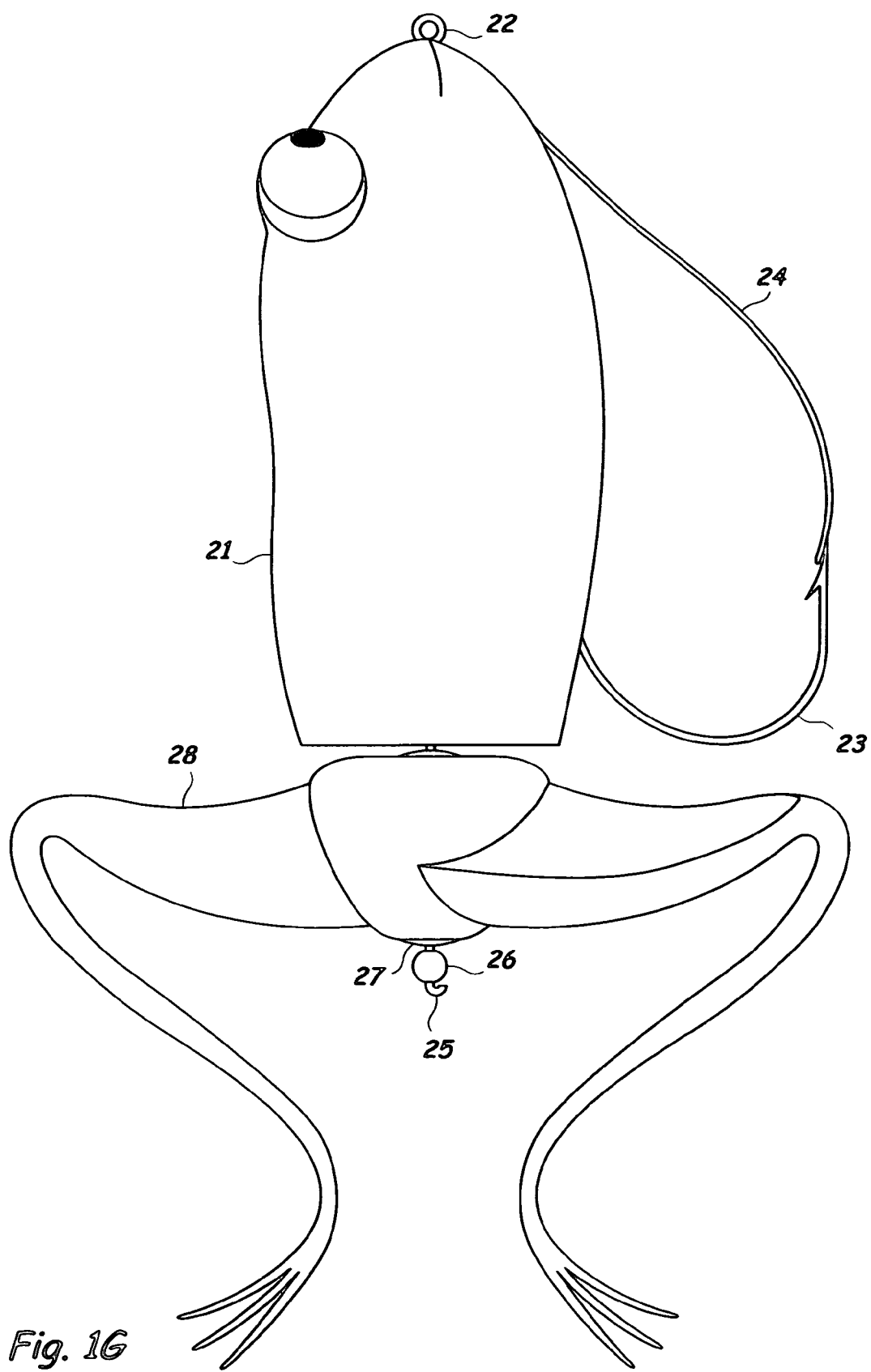

FIG. 1G shows the assembled frog bait.

Figure 1H:
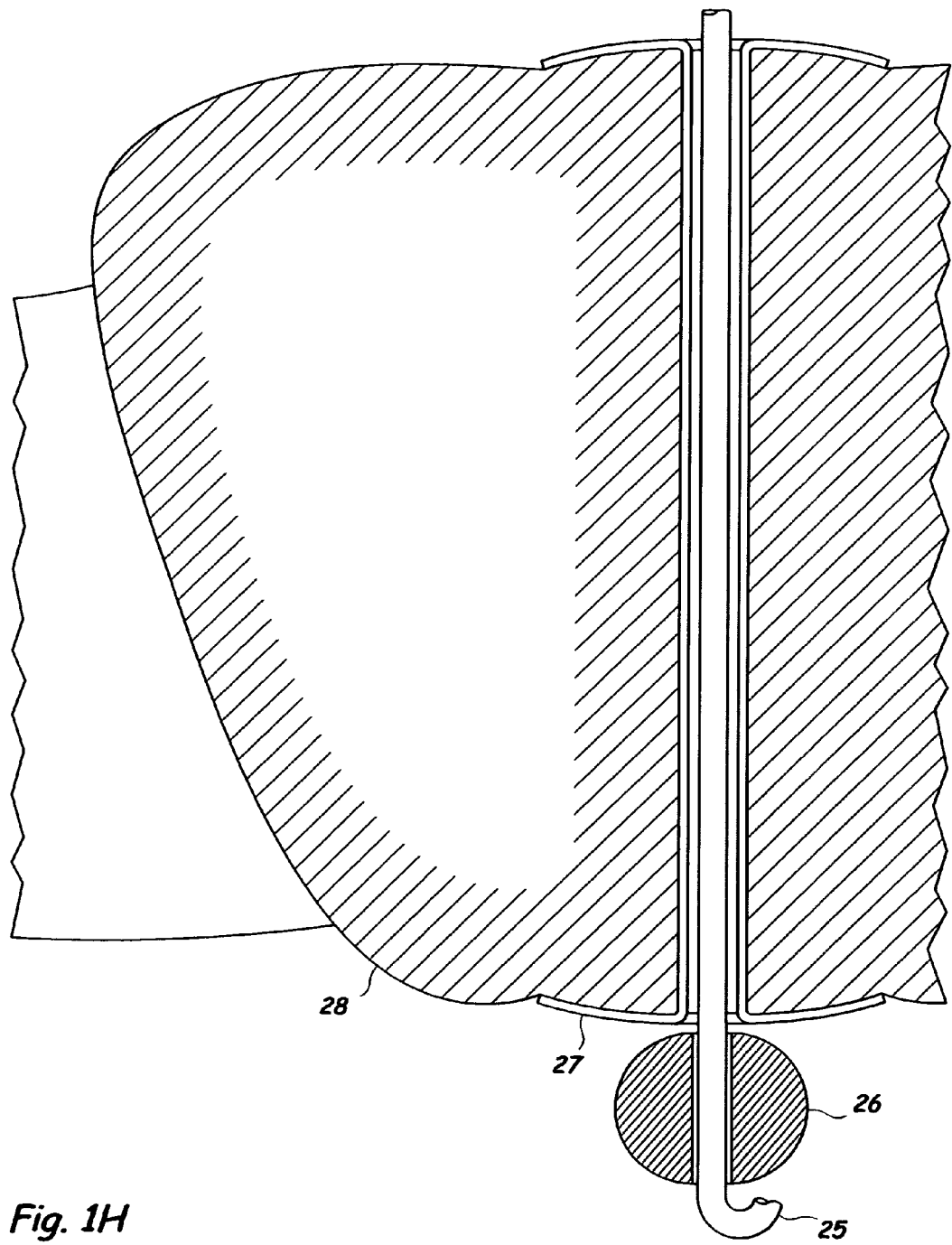

FIG. 1H shows the flexible appendage fitted over the radial bearing.

Figure 1I:
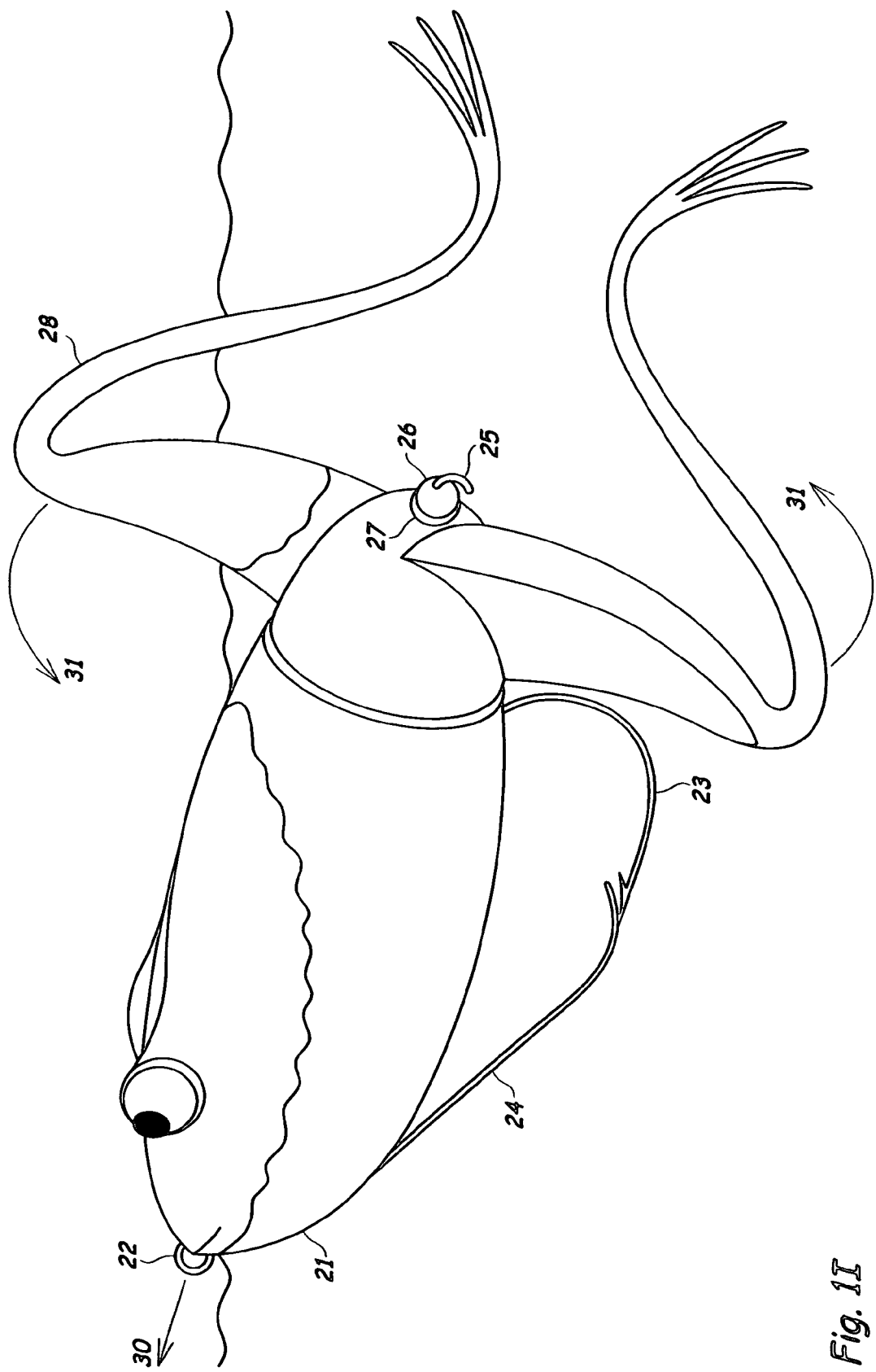

FIG. 1I shows the frog bait on water, in the process of angling.

Figure 2A:
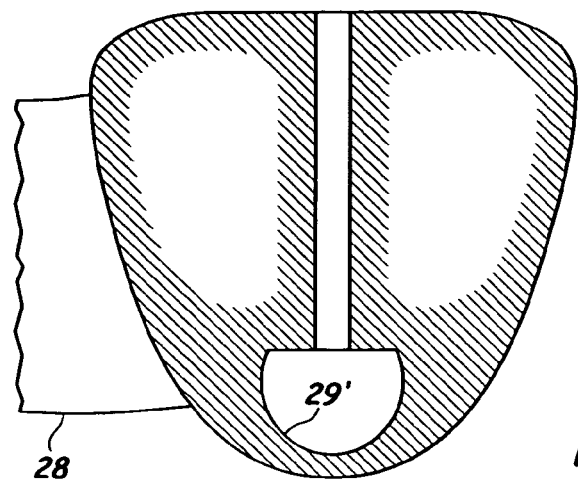
Figure 2B:
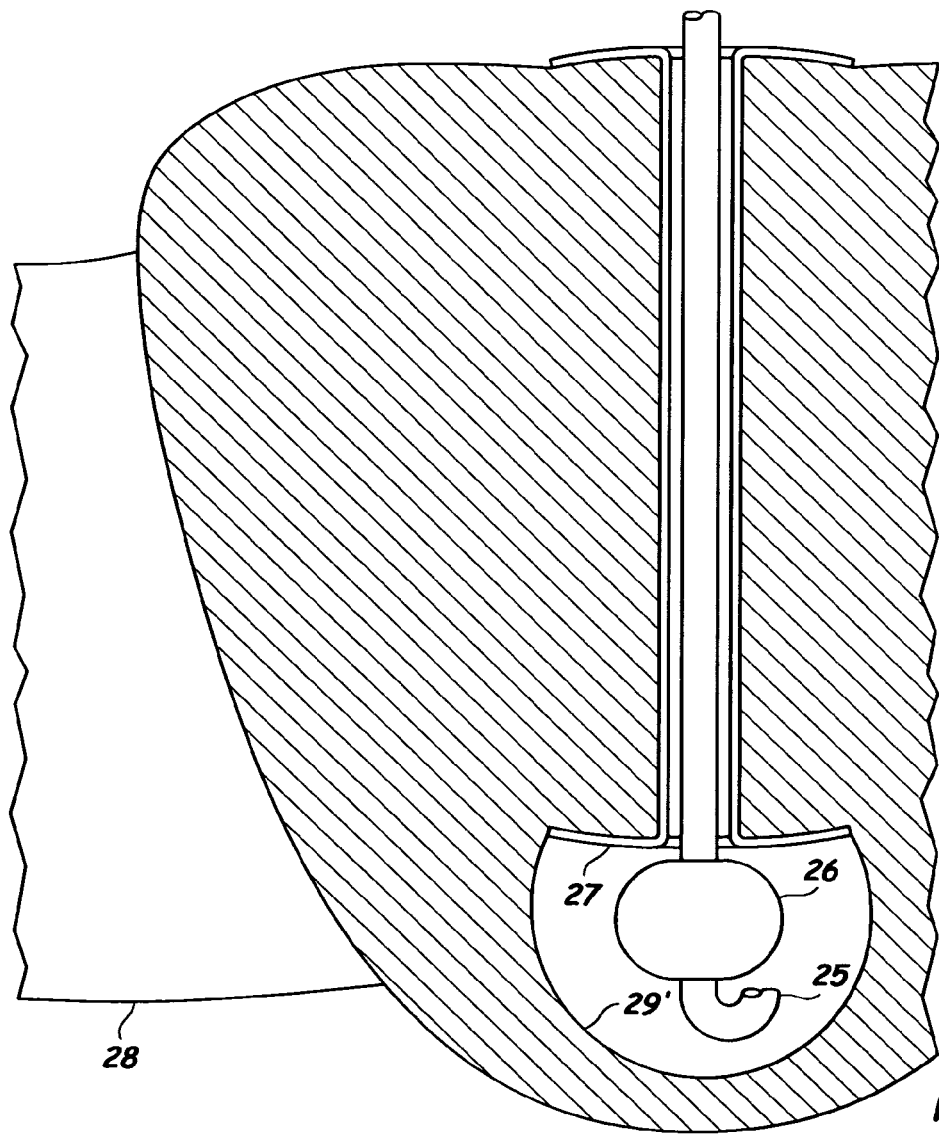

FIGS. 2A-2B show an alternative flexible appendage, with a groove.

Figure 2C:
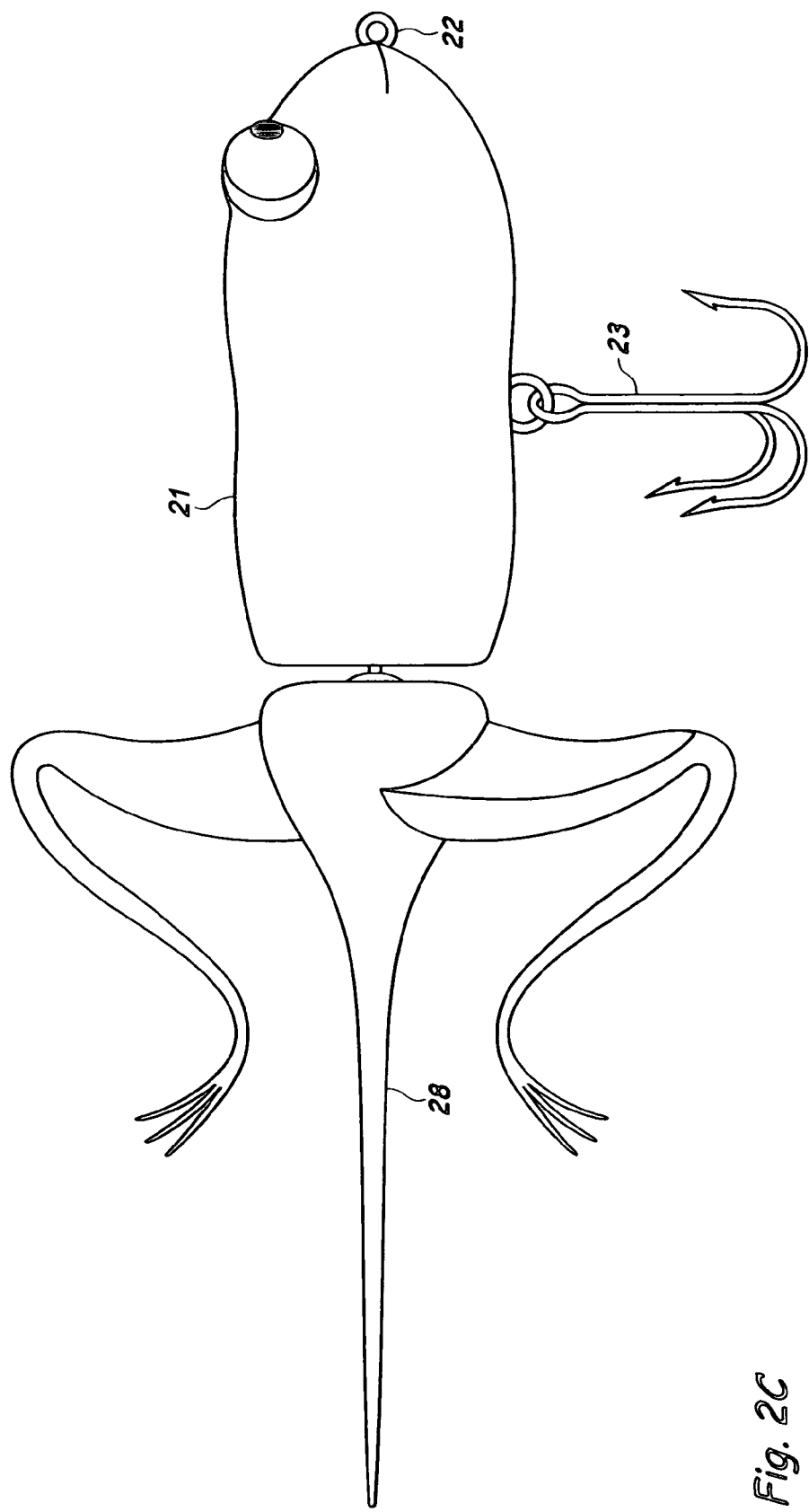

FIG. 2C shows a lizard bait where the flexible appendage ends in a tail.

Figure 2D:
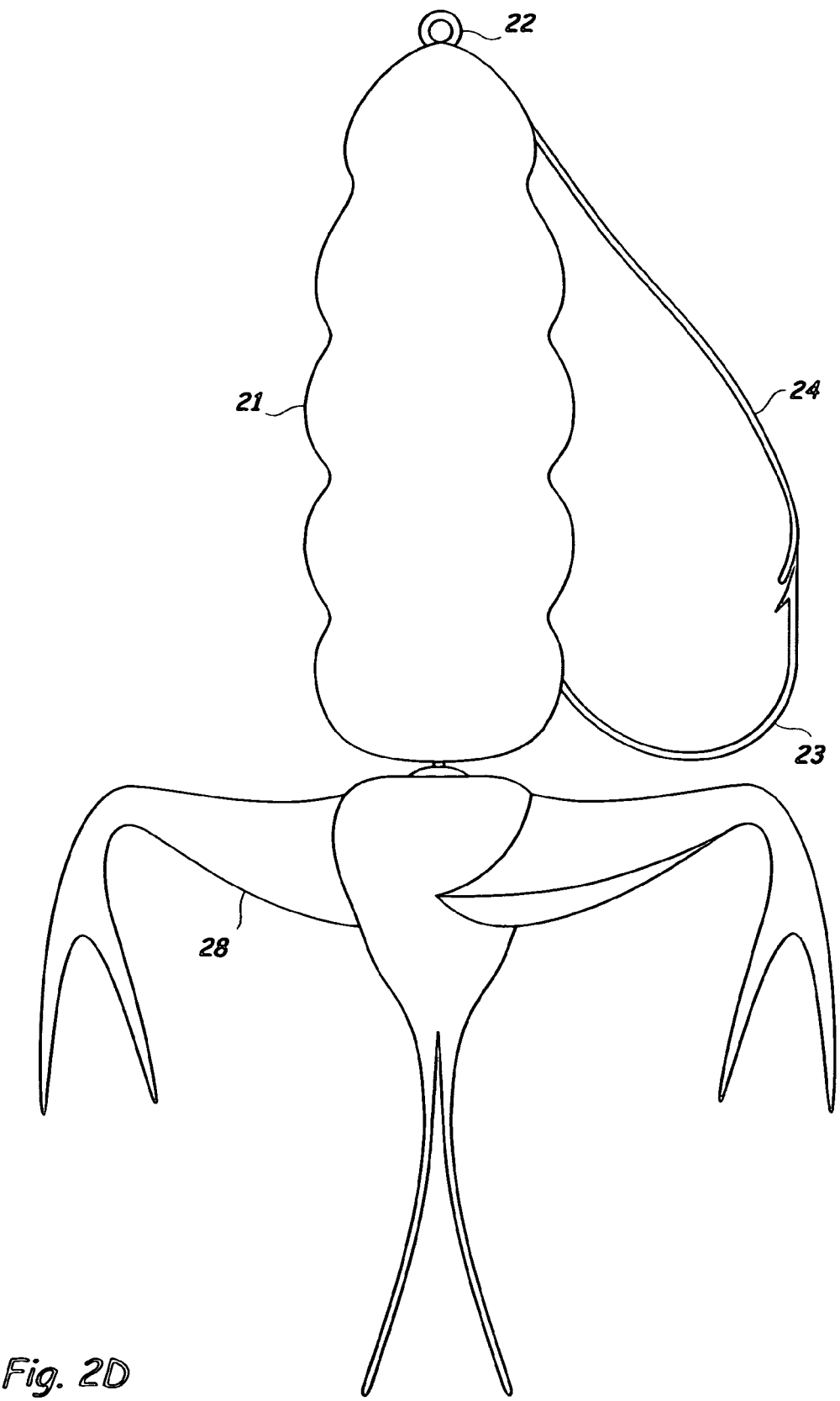

FIG. 2D shows a crawdad bait where the flexible appendage ends in a pair of whiskers.

Figure 3A:
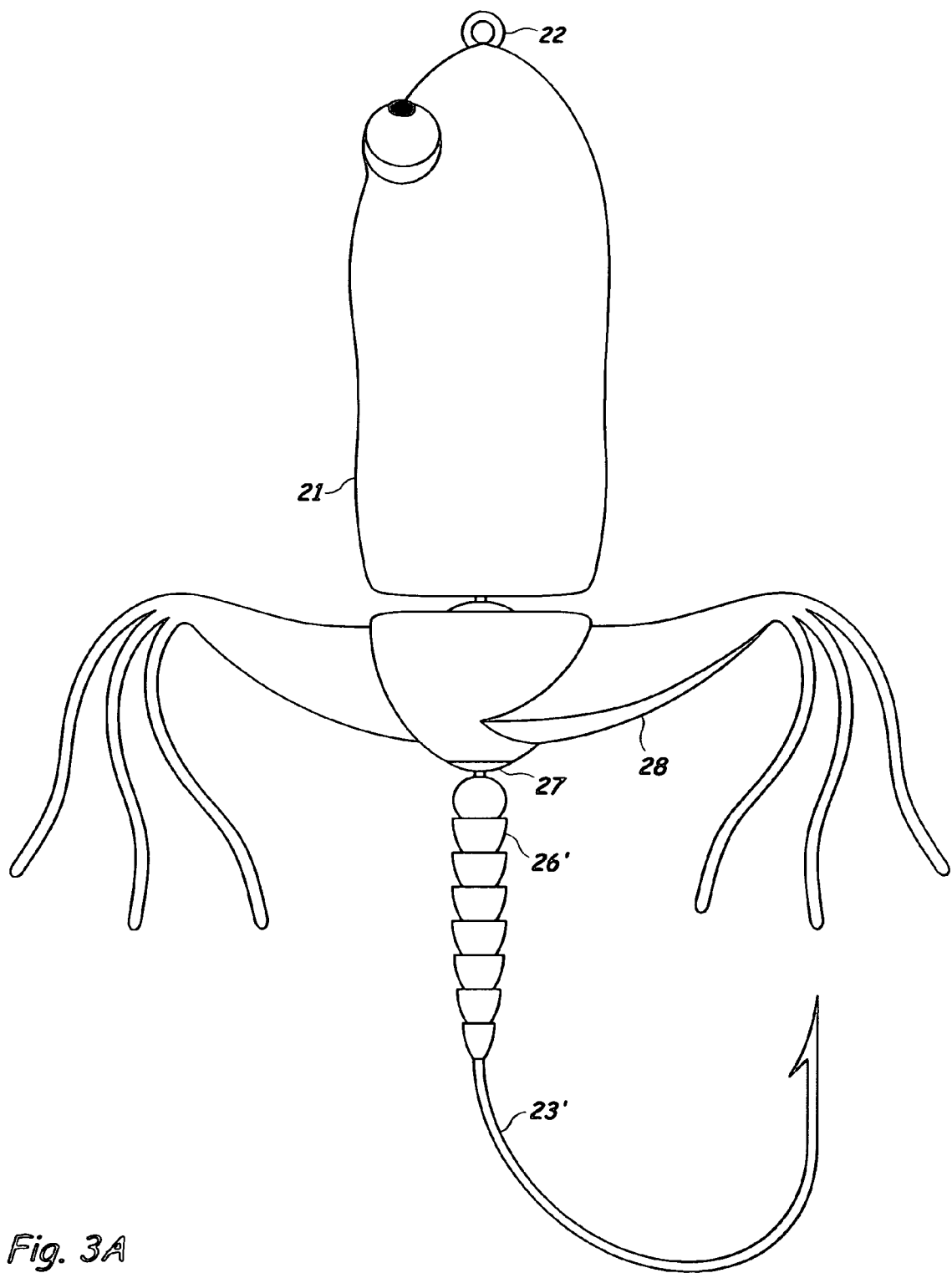
Figure 3B:
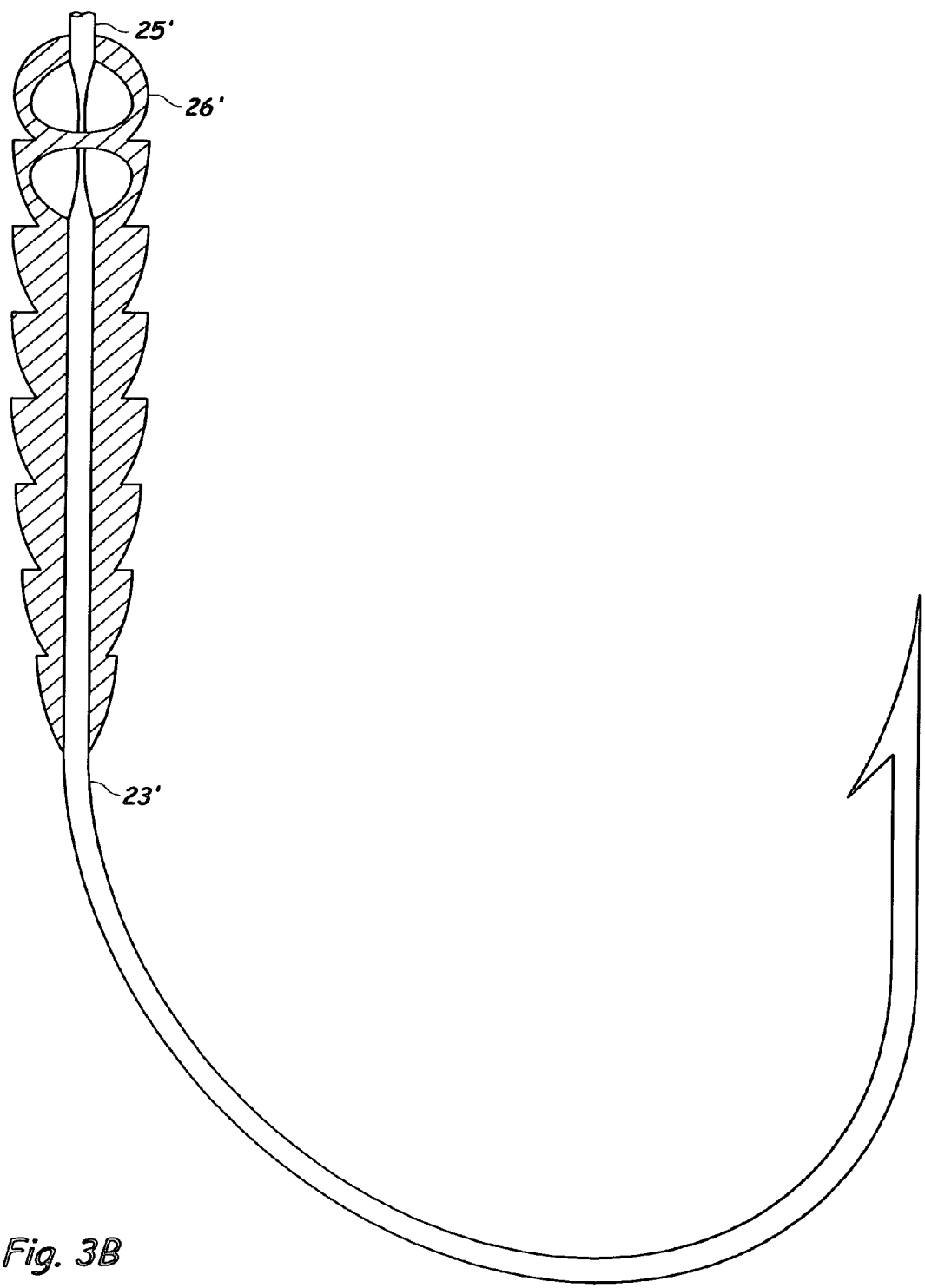

FIGS. 3A-3B show a floating creature bait where a hook is connected to a shaft.

Figure 4A:
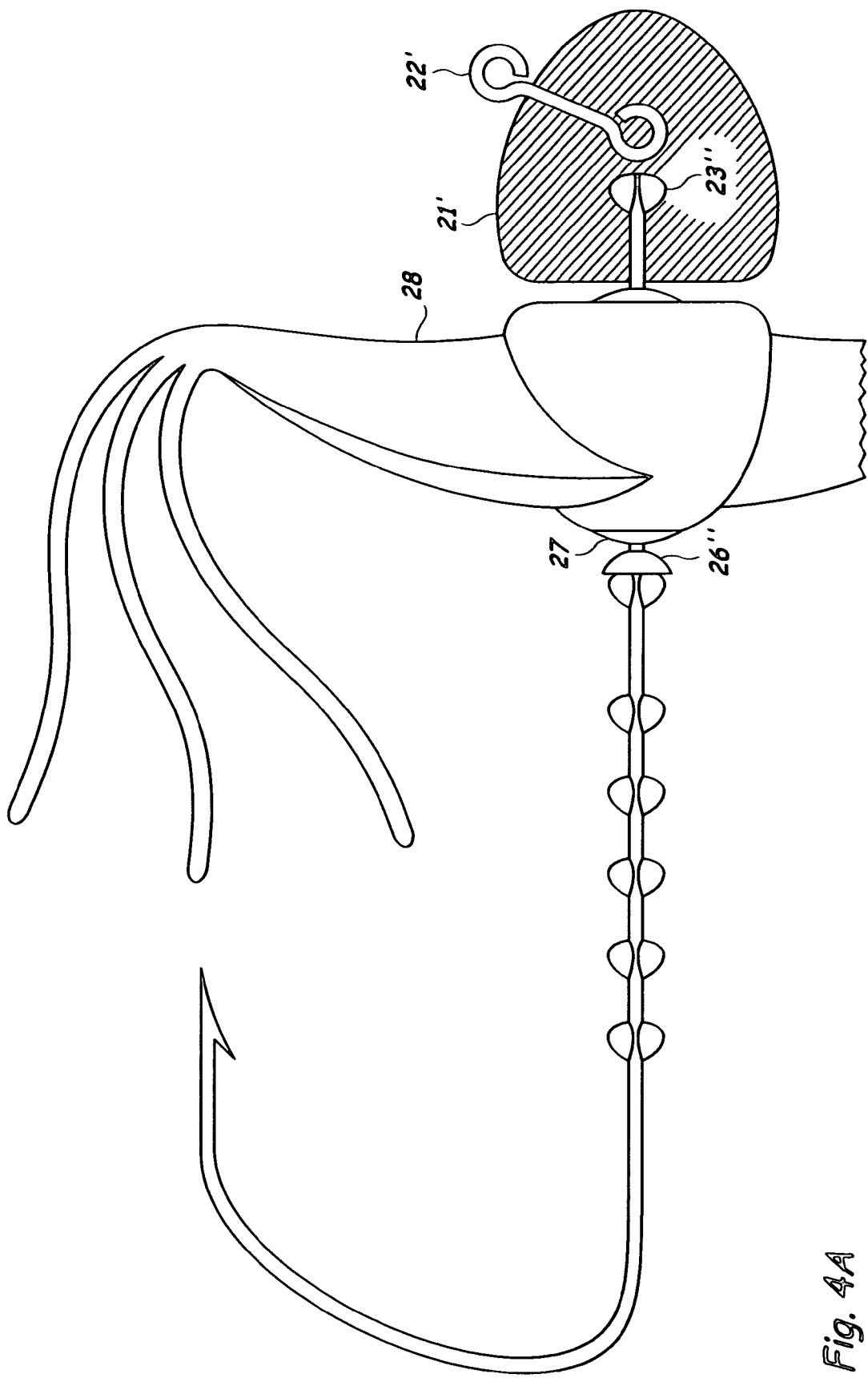

FIG. 4A shows a sinking, jig like bait, where the hook shank acts as shaft.

Figure 4B:
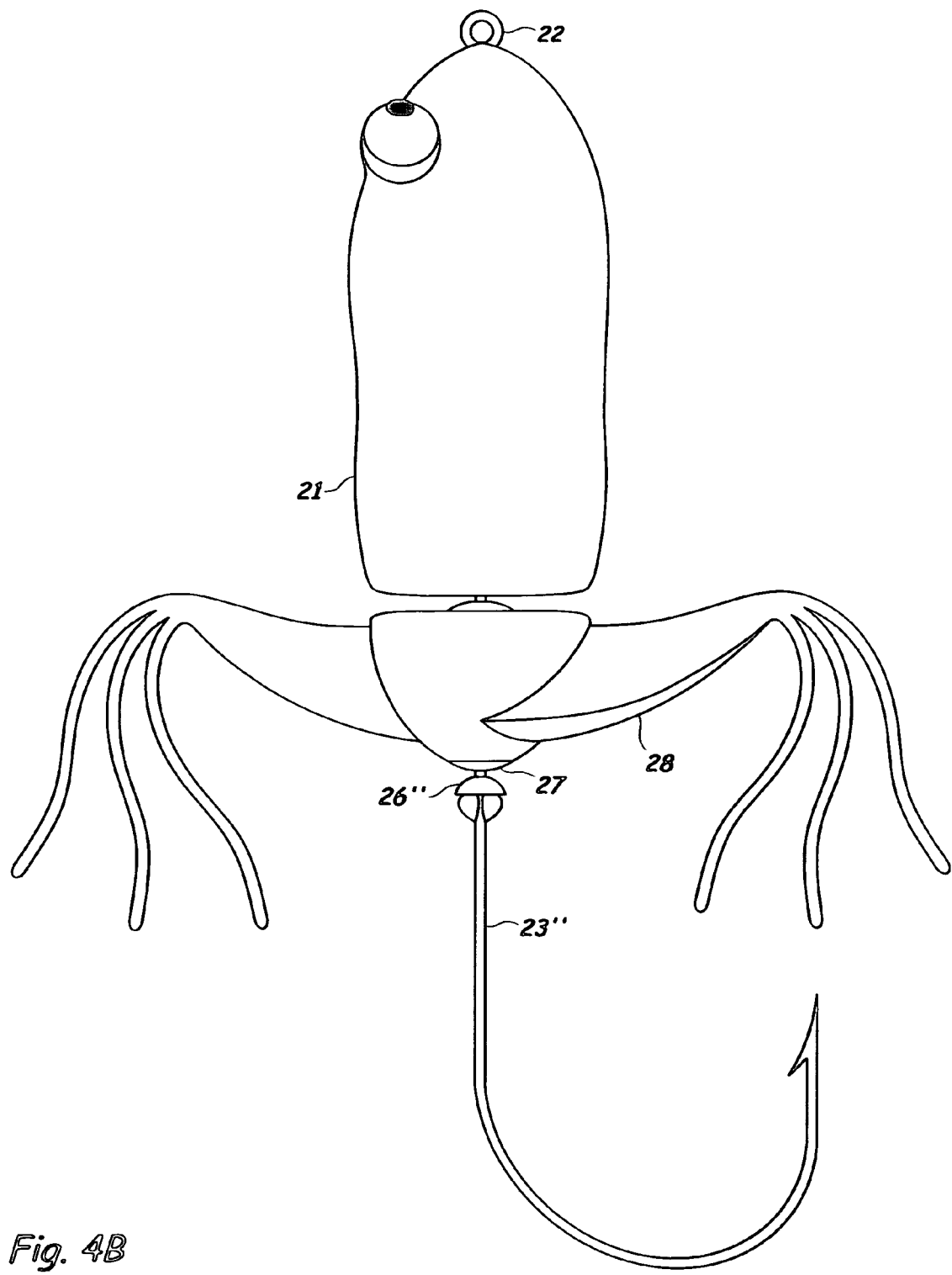

FIG. 4B shows a floating creature bait where the hook shank acts as shaft.

Figure 5:
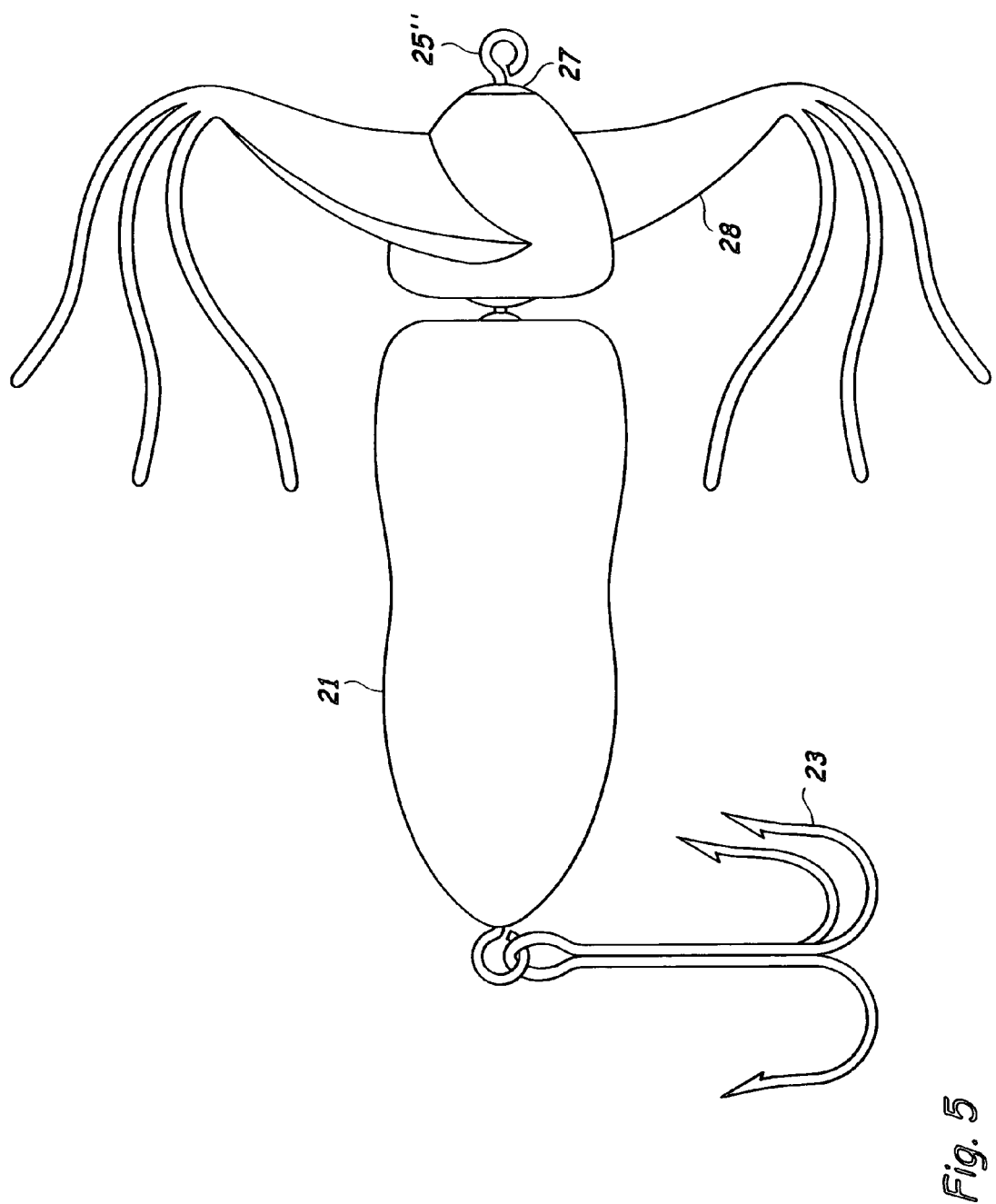

FIG. 5 shows a creature bait where the flexible appendage runs ahead of the lure body.

Figure 6:
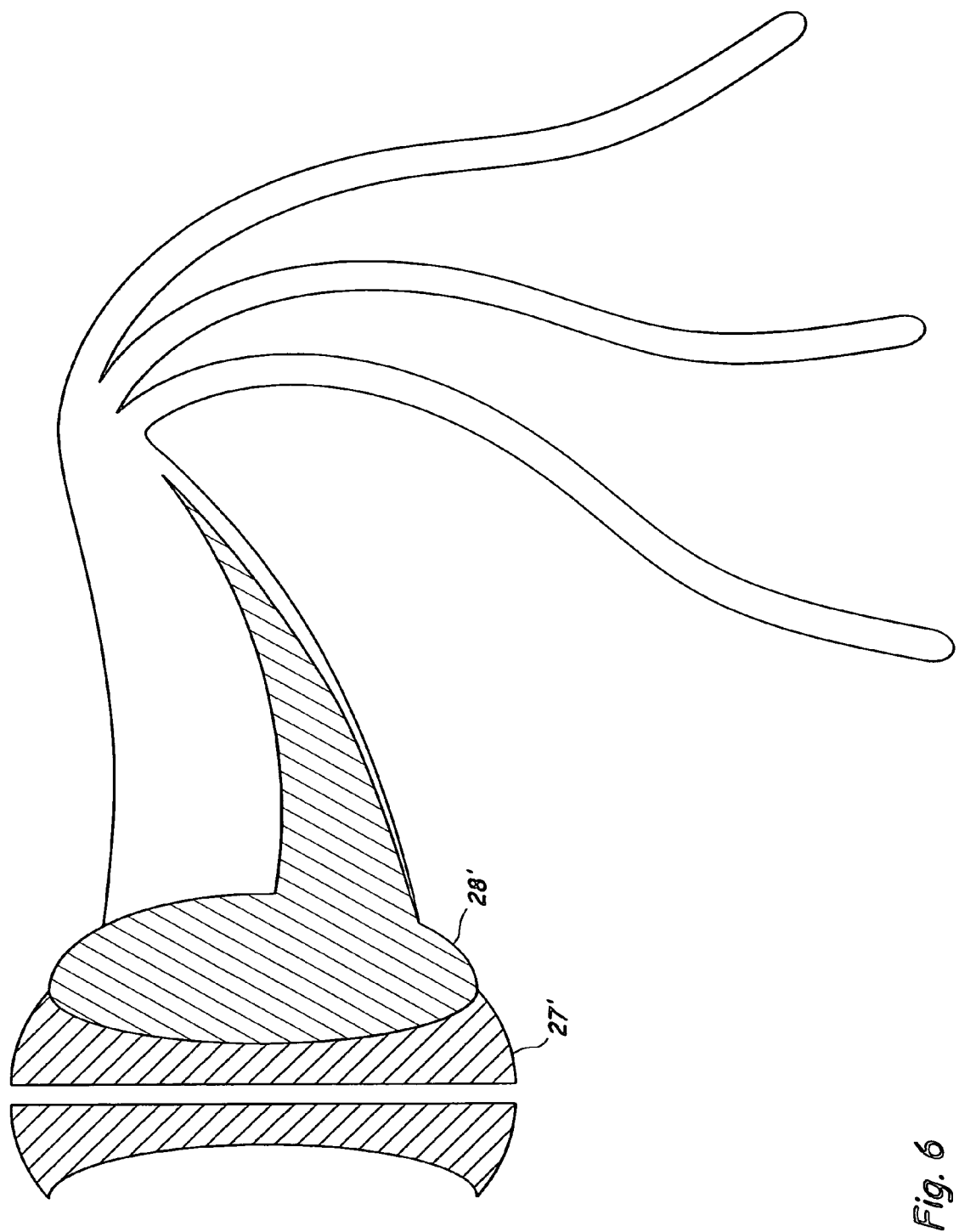

FIG. 6 shows an alternative radial bearing and a corresponding flexible appendage.

DRAWINGS—REFERENCE NUMERALS 21, 21'—lure body
22, 22'—fishing line eyelet
23, 23', 23"—hook
24—weed guard
25, 25', 25"—wire shaft
26, 26', 26"—thrust bead
27, 27'—radial bearing
28, 28'—flexible appendage
29—through hole
29'—groove
30—arrow showing pull direction
31—arrow showing rotation sense

DETAILED DESCRIPTION—FIGS. 1A-1I—PREFERRED EMBODIMENT

A preferred embodiment of the artificial bait of the present invention is a frog lure shown in FIGS. 1A-1I. FIG. 1A shows a lure body 21, equipped with an eyelet 22 for fishing line connection, a hook 23, a weed guard 24, a wire shaft 25 with a bent acting as stopper, an end thrust bearing 26 well known in the art as thrust bead, and a radial bearing 27 consisting of a thin walled metal tube with tapered ends or rims. The assembly formed by shaft 25—thrust bead 26—radial bearing 27 is shown in an enlarged detail in FIG. 1B.

A flexible appendage 28 (FIGS. 1B and 1C), made of soft plastic, consists of a hub with radial arms integrally formed thereon, partially shaped as reaction blades and imitating a pair of frog legs. The hub has an axial longitudinal through hole 29 as means to be interchangeably fitted over the radial bearing 27.

The radial bearing 27 and respectively the flexible appendage 28 hub are correlated as shape and dimensions, so that when the flexible appendage spins about its longitudinal axis it engages the radial bearing, which undertakes the friction against shaft 25 and thrust bead 26. Essentially, the through hole 29 has a diameter slightly smaller than the exterior diameter of the radial bearing 27. Accordingly, the radial bearing compresses the hub as shown in FIG. 1H, tensioning its resilient material. In turn, the hub exerts pressure on the radial bearing, the resulting friction engaging the radial bearing in rotation.

In order to assemble the lure, the appendage 28 is simply pushed by hand, as shown in FIGS. 1E and 1F by the arrow, over the thrust bead 26, then over the trailing rim of the radial bearing 27, and then fitted between the rims of the radial bearing 27, as shown in FIG. 1H. The assembled lure is shown in FIG. 1G and again in a perspective view in FIG. 1I, this time on the water.

The preferred embodiment described above is conceived as topwater bait, as is generally the case with propeller baits as well as with frog baits. Accordingly, the lure body 21 may contain a float insert—air chamber—and respectively a weight insert—lead or tin—features not shown here, being well known in the art. The wire shaft 25 could actually run through the body 21, having an eyelet for fishing line connection formed on its leading end. The thrust bead 26, shown as freely mounted on the shaft 25 to simplify the drawings, can be fixed against the bend in order to minimize friction, as the hole in a common brass bead, used for example in spinnerbaits, is actually narrower at one end. The hook 23 can be as well a double or a treble, as shown in the additional embodiment of FIG. 2C.

Operation—FIG. 1I

At rest, the frog lure floats as shown in FIG. 1I in a slightly oblique position, head up, with the legs hanging free right under the water surface. This position is important not only as natural for a frog bait, but also in order for the reaction blades to catch water on retrieve. To simplify the drawing, a fishing line is omitted.

On retrieve, when the bait is pulled as shown by the arrow 30, the water resistance forces the flexible appendage 28 in rotation as shown by the arrows 31. The flexible appendage 28 engages the radial bearing 27 which undertakes the friction against the shaft 25 respectively against the thrust bead 26.

As any propeller baits, and topwater baits in general, this embodiment of the present invention is especially effective when retrieved in a stop and go manner. Even only a sharp twitch of the rod tip makes the legs spin and kick the water with a distinct plopping sound, creating an enticing disturbance. Depending on the momentum of the applied force, the appendage limbs do not only spin, but they also flex back and forth, as a pair of frog legs would actually do. Even when paused, the soft plastic frog legs continue to shake and flex, due to inertia and any water movement. Moreover, the frog legs can be easily replaced at any time with another pair, identical or different in shape, size or color.

FIGS. 2A-2D Additional Embodiments

An alternative flexible appendage 28 shown in FIG. 2A has instead of the through-hole 29 a groove 29' shaped so as to accommodate and hide the trailing end of shaft 25, the thrust bead 26 and respectively the trailing rim of radial bearing 27, as shown in FIG. 2B, for a more natural appearance. Accordingly, the flexible appendage could end in a tail as shown in the lizard bait of FIG. 2C, or in a pair of whiskers as in the crawdad bait of FIG. 2D. During a stop and go retrieve, the whiskers would twist and then erratically untwist, adding to the illusion of a live creature.

Other possible embodiments, not shown in the drawings and not necessarily imitating a certain actual pray but simply a live creature, could have different interchangeable flexible appendages, for example ending in a split tail, spiral tail etc.

FIGS. 3A-6 Alternative Embodiments

There are various possibilities with regard to the relative disposition of the flexible appendage, the hook and respectively the lure body. If in the preferred embodiment described above the flexible appendage runs behind the hook for a more natural appearance; in the following alternative embodiments the flexible appendage runs ahead of the hook for a better fish hooking ratio.

Consequently the flexible appendage, which is fed over the trailing end of the shaft in the preferred embodiment, will be fed either over the hook point (FIGS. 3A, 4A and 4B) or over the leading end of the shaft (FIG. 5).

FIGS. 3A and 3B show a creature bait where a hook 23' is connected to the trailing end of a shaft 25' through a ribbed thrust bearing 26' which is actually molded over their tapered ends. Accordingly, the flexible appendage is fed over the hook point and the hook can be dressed with various soft plastic tails or simply a plastic worm secured on the thrust bearing.

FIG. 4A and respectively FIG. 4B show two alternative embodiments where the hook shank acts as shaft. Consequently, a hook 23" is tapered on a certain point on its shank so as to form a stopper and is equipped with a radial bearing 27 and a cupped thrust bead 26". In FIG. 4A the lure body 21' is actually a jig head, the eyelet 22' is oriented at an angle as in jigs, and the hook shank is tapered on a few more points to secure various soft plastic tails.

In FIG. 5, the flexible appendage 28 runs ahead of the lure body 21. Accordingly, the flexible appendage is fed over the eyelet formed on a shaft 25" and then a fishing line is tied to the eyelet. The present embodiment can be as well topwater or sinking bait, even for salt water, possibly featuring a metal body whose leading end acts as thrust surface in which case there is no need for a thrust bead. Alternatively, the flexible appendage could run between two body sections interchangeably connected; the eyelet formed on shaft 25" can be connected to a lure head (not shown) equipped with a snap-on clip at its trailing end and respectively with an eyelet at its leading end so that in order to change the flexible appendage, instead of cutting the line, the head is disconnected from the body.

FIG. 6 shows an alternative, solid body radial bearing 27' and a corresponding flexible appendage 28'.

CONCLUSION, RAMIFICATIONS AND SCOPE

Accordingly, the reader will see that the artificial bait of the present invention contains a radial bearing which accommodates a flexible appendage made of soft plastic or other elastic material, enabling it to spin about a shaft in the process of angling despite the high friction coefficient characteristic to such materials. Although the detailed description above contains many specificities, these should not be construed as limiting the scope of the invention, but as merely providing illustrations of a number of possible embodiments of the present invention.

The radial bearing of the invention is defined not by the particular shapes shown here, but exclusively by its function: when the appendage is forced to spin about its longitudinal axis due to the resistance opposed by water, it engages the radial bearing which in turn undertakes the inherent friction against the shaft, respectively against the thrust surface running behind. Accordingly, the radial bearing can be designed in different ways, made of various materials, consisting of one single element or a plurality of parts.

The flexible appendage, if made of a relatively durable resilient material as rubber or soft polyurethane, can be as well a permanent, integral part of the bait.

The artificial bait of the present invention can be designed in many various ways, as top-water or sinking bait, for fresh or salt water, for casting or trolling. Moreover, the shaft can be bent as in spinnerbaits, buzzbaits etc.

While the particular embodiments described above fall in the category of baits with spinning element mounted on a shaft, the present invention also provides a new type of attachment for the category of baits with flexible appendages, whether or not the flexible appendage is shaped as a propeller. Let us consider for example a frog bait with a pair of soft plastic legs where the front upper part of the leg is cupped, so as to flex back and forth when pulled through water. The advantages of this new type of attachment are: (a) it is self-aligning, and (b) it enables the flexible appendage to turn about its longitudinal axis—that is to step over when walked through cover, despite the high friction characteristic to soft, resilient materials.

Moreover, even a soft plastic appendage with no explicit built-in action whatsoever beside its inherent resilience would be enabled to spin about its longitudinal axis, whenever forced to do so by external conditions, without engaging the lure body in rotation or twisting the line.

Accordingly, the scope of the invention should be determined not by the embodiments illustrated, but by the appended claims and their legal equivalents.

I claim:

1. An artificial bait comprising
(a) a lure body;
(b) a shaft partially enclosed in said lure body, comprising a first end extending backward from a lure body trailing end and a second end embedded within said lure body;
(c) a radial bearing on said shaft, behind said lure body, wherein the radial bearing is mounted on the shaft to rotate about the shaft, the radial bearing consisting of a thin walled metal tube with a first outwardly tapered end proximate to the lure body and a second outwardly tapered end away from the lure body, said second outwardly tapered end extending radially outward from said radial bearing and tapering in a direction from said first outwardly tapered end toward said first end of said shaft; and
(d) a flexible appendage interchangeably mounted on said radial bearing,
wherein said flexible appendage is molded of elastic material, is configured to stretch to fit over the second outwardly tapered end of said radial bearing and is configured to exert pressure on said radial bearing and further wherein said flexible appendage is able to be repeatedly pushes over and respectively pulled off said radial bearing over the second outwardly tapered end.

2. An artificial bait comprising
(a) a fishing lure body coupled with a wire shaft, said wire shaft comprising a rotatable tubular radial bearing, a first end extending backward from a lure body trailing end, and a second end embedded within said lure body, wherein the radial bearing is mounted on the shaft to rotate about the shaft, the radial bearing consisting of a thin walled metal tube with a first outwardly tapered end proximate to the lure body and a second outwardly tapered end away from the lure body, said second outwardly tapered end extending radially outward from said radial bearing and tapering in a direction from said first outwardly tapered end toward said first end of said shaft, and
(b) a soft flexible appendage rotatably mountable on said wire shaft via said radial bearing, wherein said flexible appendage comprises an axial hole to fit over the second outwardly tapered end of said radial bearing and is resiliently stretchable, such that said flexible appendage is able to be repeatedly mounted on and dismounted from said radial bearing by being repeatedly pushed over and respectively pulled off of said radial bearing over the second outwardly tapered end, and said flexible appendage is able to exert pressure over said radial bearing to engage said radial bearing in rotational movement about said wire shaft.

3. An artificial bait comprising
(a) a lure body,
(b) a shaft partially enclosed in said lure body, comprising a first end extending backward from a lure body trailing end and a second end embedded within said lure body,
(c) a radial bearing of an approximately tubular shape mounted on said shaft, behind said lure body, wherein the radial bearing is mounted on the shaft to rotate about the shaft, the radial bearing consisting of a thin walled metal tube with a first outwardly tapered end proximate to the lure body and a second outwardly tapered end away from the lure body, said second outwardly tapered end extending radially outward from said radial bearing and tapering in a direction from said first outwardly tapered end toward said first end of said shaft, and
(d) a flexible appendage substantially shaped as a propeller, interchangeably mounted on said radial bearing,
wherein said flexible appendage is molded of plastic material and is stretched to fit over the second outwardly tapered end of said radial bearing; so that
(i) said flexible appendage exerts pressure on said radial bearing,
(ii) said flexible appendage flexes back and forth when said artificial bait is intermittently pulled through water, and
(iii) said flexible appendage twists when spinning about said shaft and untwists when coming to a stop,
wherein said flexible appendage is able to be repeatedly pushed over and respectively pulled off said radial bearing over the second outwardly tapered end.

4. An artificial bait comprising
(a) a fishing lure body comprising a single hook;
(b) a wire shaft comprising a first end extending behind a trailing end of said fishing lure body and a second end embedded within said lure body, said wire shaft comprising a fishing line eyelet ahead of said lure body;

(c) a tubular radial bearing independently rotatable on said shaft relative to said fishing lure body, wherein the radial bearing is mounted on the shaft to rotate about the shaft, the radial bearing consisting of a thin walled metal tube with a first outwardly tapered end proximate to the lure body and a second outwardly tapered end away from the lure body, said second outwardly tapered end extending radially outward from said radial bearing and tapering in a direction from said first outwardly tapered end toward said first end of said shaft; and (d) a soft interchangeable flexible appendage comprising an elastomeric material able to engage said radial bearing by exerting pressure, said flexible appendage further comprising a cylindrical hole configured to be repeatedly pushed over and respectively pulled off of the second outwardly tapered end of said radial bearing.

5. An artificial bait comprising
(a) a lure body,
(b) a single hook,
(c) a shaft partially enclosed in said lure body, comprising a first end extending backward from a lure body trailing end and a second end embedded within said lure body,
(d) a radial bearing of an approximately tubular shape mounted on said shaft, behind said lure body, wherein the radial bearing is mounted on the shaft to rotate about the shaft, the radial bearing consisting of a thin walled metal tube with a first outwardly tapered end proximate to the lure body and a second outwardly tapered end away from the lure body, said second outwardly tapered end extending radially outward from said radial bearing and tapering in a direction from said first outwardly tapered end toward said first end of said shaft, and
(e) a flexible appendage substantially shaped as a propeller, interchangeably mounted on said radial bearing,
wherein said flexible appendage is molded of soft elastomeric material and is stretched to fit over the second outwardly tapered end of said radial bearing; so that
(i) said flexible appendage exerts pressure on said radial bearing,
(ii) said flexible appendage flexes back and forth when said artificial bait is intermittently pulled through water, and
(iii) said flexible appendage twists when spinning about said shaft and untwists when coming to a stop,
wherein said flexible appendage is able to be repeatedly pushed over and respectively pulled off said radial bearing over the second outwardly tapered end.

6. The artificial bait of claim 5 wherein said flexible appendage is shaped as a pair of frog legs partly stretched out and partly bent in, so that when said flexible appendage spins about said shaft, said flexible appendage flexes in a radial direction, respectively inward when said flexible appendage accelerates and flexes in a radial direction outward when said flexible appendage decelerates.

7. The artificial bait of claim 5 wherein said hook is positioned ahead of said flexible appendage, being attached to said lure body, whereby said flexible appendage is mounted on said radial bearing being fed over said first end of said shaft.

8. The artificial bait of claim 5 wherein said hook is positioned behind said flexible appendage, being connected to said first end of said shaft, whereby
(j) said flexible appendage is mounted on said radial bearing being fed over said hook, and
(k) said flexible appendage collapses when bitten by fish, exposing said hook.

9. An artificial bait comprising
(a) a fishing lure body comprising a fishing line eyelet and a hook;
(b) a wire shaft coupled to said fishing lure body comprising a first end extending behind a trailing end of said fishing lure body and a second end embedded within said fishing lure body;
(c) an end thrust bead positioned on said shaft;
(d) a tubular radial bearing independently rotatable on said shaft relative to said end thrust bead, wherein the radial bearing is mounted on the shaft to rotate about the shaft, the radial bearing consisting of a thin walled metal tube with a first outwardly tapered end proximate to the lure body and a second outwardly tapered end away from the lure body, said second outwardly tapered end extending radially outward from said radial bearing and tapering in a direction from said first outwardly tapered end toward said first end of said shaft; and
(e) a soft interchangeable flexible appendage comprising an elastomeric material able to engage said radial bearing by exerting pressure, said flexible appendage further comprising a cylindrical hole configured to be repeatedly pushed over and respectively pulled off of the second outwardly tapered end of said radial bearing.

* * * * *

UNITED STATES PATENT AND TRADEMARK OFFICE
CERTIFICATE OF CORRECTION

Page 1 of 1

| | |
|---|---|
| PATENT NO. | : 7,861,455 B2 |
| APPLICATION NO. | : 11/524144 |
| DATED | : January 4, 2011 |
| INVENTOR(S) | : Neculai Ciotlos |

It is certified that error appears in the above-identified patent and that said Letters Patent is hereby corrected as shown below:

ON THE TITLE PAGE ITEM (56) IN THE REFERENCES CITED

Please replace "2,230,919 A * 2/1941 Glenn, I" with -- 2,230,919 A * 2/1941 Wick --.

Please replace "2,753,650 A * 7/1956 Frank et al." with -- 2,753,650 A * 7/1956 Rentz et al. --.

Please replace "3,289,345 A * 12/1966 Gail et al." with -- 3,289,345 A * 12/1966 Reininger et al. --.

IN THE CLAIMS

At column 6, line 6, claim 1, replace "pushes" with -- pushed -- so that the corresponding phrase reads -- pushed over and respectively pulled off --.

Signed and Sealed this
First Day of March, 2011

David J. Kappos
*Director of the United States Patent and Trademark Office*